July 4, 1967     D. J. VOLLMER     3,329,168
PRESSURE-BALANCED SLIDE VALVE
Filed Aug. 3, 1965     2 Sheets-Sheet 1
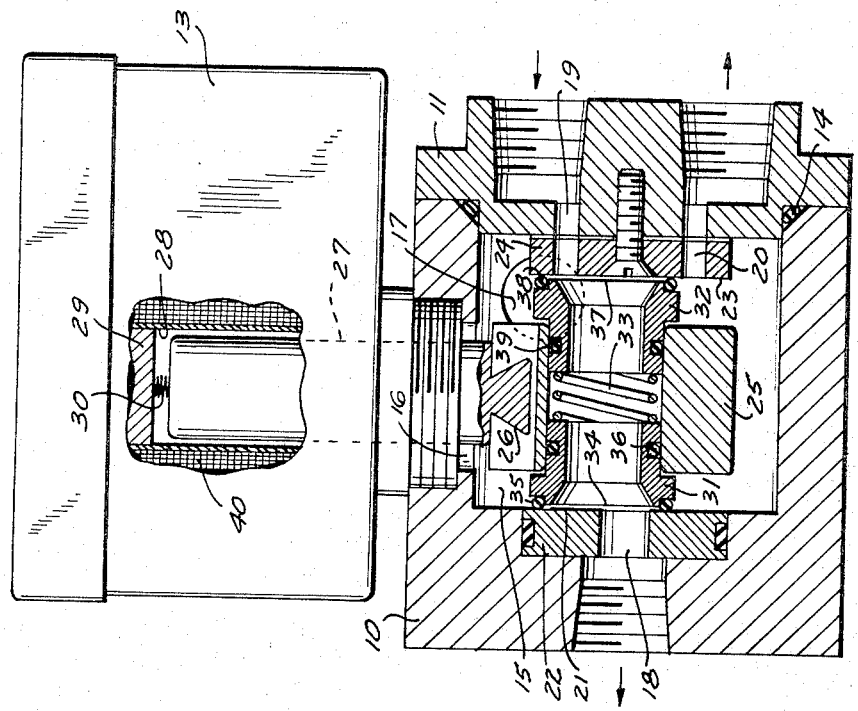
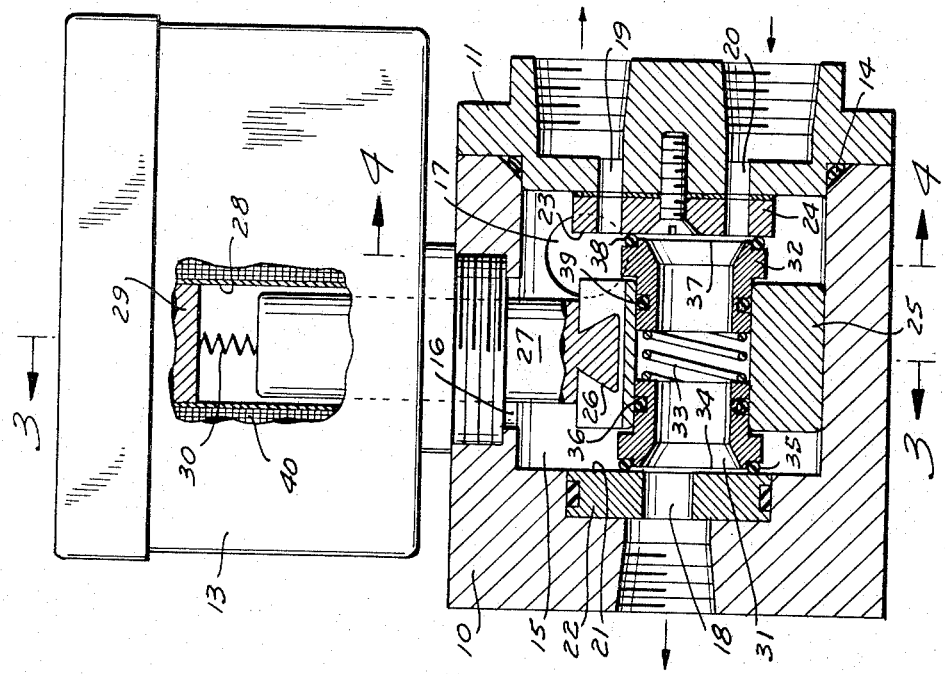
INVENTOR:
DAVID J. VOLLMER
BY
Breitenfeld & Levine
ATTORNEYS July 4, 1967  D. J. VOLLMER  3,329,168
PRESSURE-BALANCED SLIDE VALVE
Filed Aug. 3, 1965  2 Sheets-Sheet 2
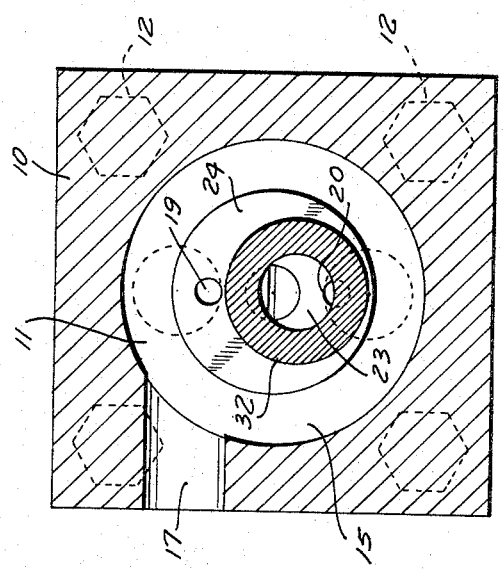
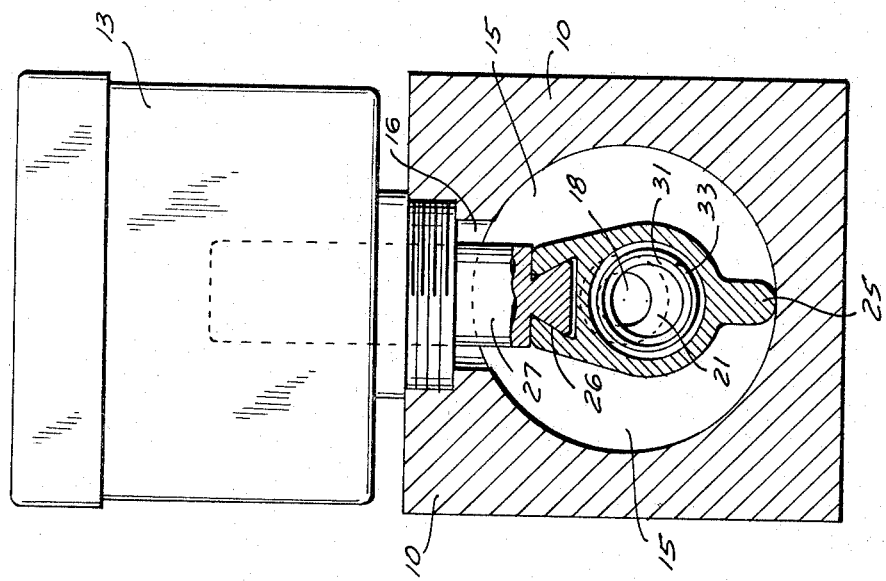
INVENTOR:
DAVID J. VOLLMER
BY
Breitenfeld & Levine
ATTORNEYS

United States Patent Office 3,329,168
Patented July 4, 1967

3,329,168
PRESSURE-BALANCED SLIDE VALVE
David J. Vollmer, Madison, N.J., assignor to Automatic Switch Company, Florham Park, N.J., a corporation of New York
Filed Aug. 3, 1965, Ser. No. 476,912
6 Claims. (Cl. 137—625.65)

This invention relates generally to valves, and has particular reference to slide valves.

It is a general object of the invention to provide an improved slide valve structure wherein the reciprocable valve member is "pressure-balanced" so that an actuating force of materially reduced magnitude can be employed.

In moving a conventional slide valve, to control the flow of fluid from one part of an apparatus to another, the forces to be overcome are engendered by friction and by fluid momentum. Of these, the major one is the frictional resistance caused by the pressure differential on the opposite sides of the movable valve member. It is the primary specific objective of the present invention to provide a valve in which this "pressure drag" has been completely eliminated, or reduced to a negligible value.

Another object of the invention is to provide a valve which is formed of relatively simple and uncomplicated components and whose moving parts can be manufactured of relatively inexpensive materials.

By means of the present invention, it is possible to provide a slide valve which is relatively low in manufacturing cost, which utilizes a minimum of power, and which is subjected to less wear and is therefore useful for a prolonged period of time.

One of the common purposes of a slide valve is to control a three-way or four-way valve, and the invention will therefore be described in an embodiment of that nature. A four-way valve is employed, for example, to actuate a hydraulic or pneumatic cylinder which in turn controls the operation of some element or mechanism to be reciprocated (e.g., a gate valve, a molding press, a clamp, or the like). Stated more generally, a four-way valve serves to connect two work chambers alternately to a source of high-pressure fluid and exhaust. The chambers may be, for example, those on the opposite sides of a piston in a hydraulic or pneumatic cylinder, the movements of the piston serving to control the piece or element which is to be reciprocated.

A feature of the present improved valve construction, contributing to an achievement of the desired result, is an arrangement whereby the pressurized work chamber is exhausted through the slide mechanism itself. This is brought about by the provision of a slide valve member having an opening extending through it and adapted to communicate at its opposite ends, respectively, with the exhaust and with the work chamber or chambers.

A valve embodying the features of the invention is illustrated, by way of example, in the accompanying drawings, in which—

FIG. 1 is a cross-sectional view of the valve with the slide member in one of its settings;

FIG. 2 is a view similar to FIG. 1 showing the slide member in another of its settings;

FIG. 3 is a cross-sectional view substantially along the line 3—3 of FIG. 1; and FIG. 4 is a cross-sectional view substantially along the line 4—4 of FIG. 1.

The valve chosen for illustration is a four-way valve having a body formed of two sections 10 and 11 secured together by appropriate bolts or other fasteners indicated at 12 (FIG. 4), and a solenoid housing 13. The body may be substantially square or rectangular in external contour (FIGS. 3 and 4). The sections 10 and 11 are tightly clamped together, preferably with the aid of a gasket 14, and they are shaped to define an internal substantially cylindrical chamber 15. The passages communicating with this internal chamber 15 consist not only of the opening 16 within which the solenoid is mounted, but also four fluid passages, viz., the passage 17 leading to a source of pressure fluid, the passage 18 leading to exhaust, and adjacent passages 19 and 20 leading to work chambers (not shown). As previously indicated, these work chambers may be, for example, those on the opposite side of a piston whose movements control apparatus to be reciprocated.

The passages 19 and 20 are preferably at one end of the cylindrical chamber 15, while the exhaust chamber is at the opposite end, as shown. The chamber face 21 from which the exhaust passage 18 leads may be advantageously formed of brass or stainless steel, and for this purpose it may be convenient to form the chamber with an insert 22 as shown. Similarly, the face 23 which is parallel and opposed to the face 21, and from which the work passages 19 and 20 lead, may be formed on a separately attached brass or stainless steel element 24.

The slide mechanism consists of a carrier 25 articulated or secured, as at 26, to the end of a solenoid armature 27. The latter is adapted to move back and forth within a conventional core tube 28 with a plug-nut 29 at one end and surrounded by the solenoid winding 40. A compression spring 30 is provided, in the device illustrated, to urge the armature 27 into the position of FIG. 1 when the solenoid is deenergized. When the windings of the solenoid are energized, the armature 27 is drawn up into the position shown in FIG. 2, moving the carrier 25 with it.

It will be observed that this reciprocating movement is parallel to the opposed parallel chamber faces 21 and 23. The carrier 25 is provided with an opening through it and tubular closure elements 31 and 32 are mounted in the ends of this opening and project from it. The opening extends in a direction generally transverse to the direction of reciprocation of the carrier 25, and where the exhaust and work passages 18, 19 and 20 are arranged in opposed parallel chamber faces 21, 23, as shown, the opening in the carrier 25 is a simple cylinder. Within this opening a means is provided for urging the closure elements 31, 32 outwardly. For this purpose a simple compression spring 33 is appropriate.

The outer face 34 of the closure element 31 is of such size that it maintains constant communication with the exhaust passage 18, regardless of the setting of the sliding mechanism. Associated with this outer face is a sealing ring 35 which engages the chamber face 21. Near its inner end the element 31 may be provided with a second sealing ring 36 adapted to engage with the carrier opening in which the element 31 is mounted. Similarly, the outer face 37 of the closure element 32 is provided with a sealing ring 38 adapted to engage with the chamber face 23, and near its inner end the element 32 may be provided with a sealing ring 39 engaging with the opening in the carrier 25.

The sealing rings 35, 36, 38 and 39 are not in all cases essential, and if reasonably tight sliding fits can be provided for, the mechanism will work just as well.

The work passages 19 and 20 are so located, with respect to the size of the outer face 37 of the closure element 32 that as the latter slides back and forth along the chamber face 23 it will establish communication with one or the other of the passages 19, 20, to the exclusion of the other. Thus, in FIG. 1, a communication is established between the passage 20 and the exhaust passage 18, through the transverse opening in the carrier element. At the same time, there is a communication between the work passage 19 and the interior of the chamber 15, hence with the pressure port 17. In FIG. 2, it will be noticed that the communications have been altered to the extent that the passage 19 now communicates with the exhaust passage 18, while the work passage 20 communicates with the interior of the chamber 15, hence with the pressure inlet passage 17.

The carrier 25 may have any appropriate shape, but it should be noted that the size and shape are such that the interior of the chamber 15 remains in constant communication with the pressure inlet passage 17, regardless of the setting of the reciprocating assembly.

Thus, if the device shown is to be used as a four-way valve for controlling a work cylinder or the like, the valve will be adjusted into the position of FIG. 1 when pressure fluid is to be introduced through the work passage 20 and exhaust is to take place through the work passage 19; and if the flow of pressure fluid through the work passages 19 and 20 is to be reversed the valve is adjusted into the setting shown in FIG. 2. Obviously, the device can also be used as a three-way valve by simply plugging one of the work passages 19 and 20. In such an event, the reciprocating movement of the valve member will bring the closure element 32 into and out of a setting in which the opening through the carrier communicates with the exhaust. For example, if the work passage 20 is plugged, then the setting of FIG. 1 will serve to introduce pressure fluid through the work passage 19, while the setting of FIG. 2 will serve to connect passage 19 with the exhaust.

It will be understood that the reciprocating movements of the slide valve need not be effectuated by the solenoid. Any other reciprocating means may be provided. In any case, a very low actuating force is all that is required, because the only forces to be overcome are those arising from fluid momentum and from the small frictional drag due to the pressure of the spring 33 or its equivalent. Each closure element 31, 32 is "pressure-balanced," i.e., any tendency of the pressure fluid within the chamber 15 to urge either closure element against the wall on which it slides is balanced by an equal, or substantially equal, urgence in the opposite direction. These opposing forces can be made precisely equal if the diameters in the regions of the sealing rings 38, 39 (in the one case) and 35, 36 (in the other case) are appropriately chosen.

It is to be understood that many of the details herein described and illustrated may be modified by those skilled in the art without necessarily departing from the spirit and scope of the invention as expressed in the appended claims.

What is claimed is:
1. In a valve of the character described: a body provided with an internal chamber and passages communicating with it, said passages being an inlet for pressure fluid, an exhaust, and at least one work passage; and a valve member mounted for reciprocation in said chamber and adapted, depending upon its setting, to establish communication between said work passage and either the pressure inlet or the exhaust; said valve member comprising:
a carrier having an opening through it extending transverse to the direction of reciprocatory movement,
tubular closure elements mounted in said opening in alignment therewith and projecting from its its opposite ends respectively,
means between said elements urging them outward,
the outer face of one of said elements fitting slidably against the chamber face from which the exhaust passage leads,
the outer face of the other closure element fitting slidably against the chamber face from which the work passage leads,
said one of said elements being of a size to maintain constant communication between the carrier opening and the exhaust passage,
the work passage being so located that the other element is slidable into and out of a setting in which the carrier opening communicates with said work passage, and
said carrier being of such size and shape that the pressure inlet remains in communication with said chamber in all settings of the valve member.

2. A valve as defined in claim 1, in which the internal chamber has a pair of parallel opposed faces, the exhaust passage leading from one of them and the work passage from the other.

3. A valve as defined in claim 2, in which said carrier is medially articulated to a solenoid armature by means of which it is moved bodily back and forth in a direction parallel to said opposed chamber faces.

4. A valve as defined in claim 1, in which there are two adjacent work passages leading from the same chamber face, said passages being so located that the closure element sliding on said face can establish communication with either one to the exclusion of the other.

5. A valve as defined in claim 4, in which the chamber face from which the exhaust passage leads is parallel and opposed to the one from which said two work passages lead.

6. A valve as defined in claim 1, in which each tubular closure element is provided with an inner sealing ring in engagement with the carrier opening and an outer sealing ring in engagement with the corresponding chamber face.

References Cited

UNITED STATES PATENTS

| | | | |
|---|---|---|---|
| 2,560,841 | 7/1951 | Bishop | 137—625.48 |
| 2,959,189 | 11/1960 | Natho | 137—625.65 |
| 3,174,403 | 3/1965 | McCoy | 137—625.42 X |

M. CARY NELSON, *Primary Examiner.*

H. KLINKSIEK, *Assistant Examiner.*